UNITED STATES PATENT OFFICE.

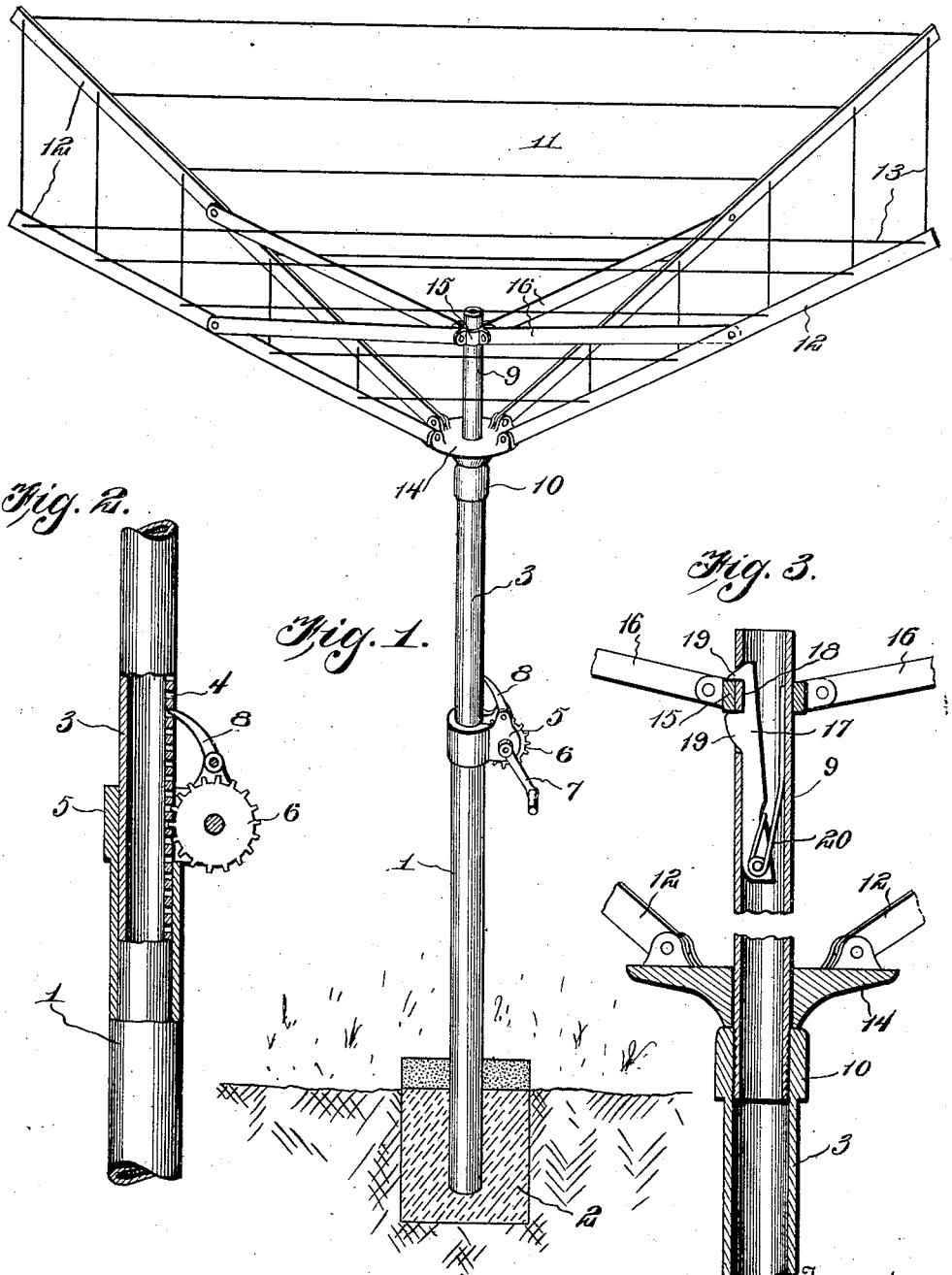

WILLIAM S. MORGAN, OF MINNEAPOLIS, MINNESOTA.

CLOTHES-DRIER.

No. 908,481.  Specification of Letters Patent.  Patented Jan. 5, 1909.

Application filed January 28, 1908. Serial No. 412,973.

*To all whom it may concern:*

Be it known that I, WILLIAM S. MORGAN, a citizen of the United States, residing at Minneapolis, in the county of Hennepin and State of Minnesota, have invented certain new and useful Improvements in a Clothes-Drier; and I do declare the following to be a full, clear, and exact description of the invention, such as will enable others skilled in the art to which it appertains to make and use the same.

This invention relates to new and useful improvements in clothes driers, and has for its object the production of a simple and economical device of this kind susceptible of ready adjustment.

A further object of the invention is to provide means for locking the reel head on which the clothes to be dried are placed, in position.

With the foregoing and other objects in view, the invention consists of certain novel features of construction, combination and arrangement of parts, as will be more fully described and particularly pointed out in the appended claim.

In the accompanying drawings: Figure 1 is a perspective view of a device constructed in accordance with the invention. Fig. 2 is a central, vertical sectional view of the supporting and adjusting means for the reel head; and Fig. 3 is a similar view of the reel head locking mechanism and the coöperative parts.

In the embodiment illustrated it will be seen that the improved clothes drier comprises an upright guide post or member 1 of tubular form, said member being preferably arranged to have its lower end fit in a corresponding socket formed in a suitable base 2 of cement or other suitable material.

In carrying out the invention, an adjusting support 3 also of tubular form is mounted to slide in the post or member 1, said adjusting member being formed with a plurality or series of alined longitudinally spaced apertures 4, the purpose of which will be disclosed. Said support 3 may be adjusted and maintained at any suitable point by various arrangements, but I have shown and will describe an arrangement that is preferably employed. A bearing 5 is formed at the upper end of the guide post or member 1 and journaled to said bearing is a suitable gear wheel 6 the teeth of which are so spaced as to engage with the apertures of the adjusting member 3. A suitable handle 7 is fixed to one end of the shaft to which the gear wheel 6 is fixed to permit of rotation being imparted to the latter. A detent 8 is pivotally mounted upon the bearing 5 preferably in position to have its free end engage with either of the apertures of said adjusting member whereby the latter may be maintained in an adjusted position.

The numeral 9 represents an upright casing which is connected with the adjusting member 3 by a suitable connection 10.

The numeral 11 indicates the reel head which comprises a plurality of arms 12 connected together at their outer ends by cords, wires, or other suitable flexible elements 13 and having their lower inner ends pivotally mounted on a rotary collar 14 which is adapted to fit over the upright tubular member 9 and bear on the connection 10 between said tubular member and the adjusting member 3. A locking ring formed with outstanding spaced lugs is adapted to slide upon the tubular member 9 and is connected with the arm 12 of the reel head by connecting bars or members 16. To lock the reel head in an open position to receive the clothes to be dried, the following arrangement is preferably employed.

An upright catch 17 is arranged within and pivoted at its lower end to the casing 9, the free or upper end of the catch being somewhat enlarged and normally extending through a corresponding slot formed in the casing, and having a recess 18, formed in its outer edge, leaving vertically spaced flanges 19, the side edge of the lower flange of which is of gradually and inwardly curved form, the purpose of which will be disclosed. A spring 20 is arranged within the casing to normally exert pressure on the catch 17.

In practice, to lock the reel head in an open position to receive the clothes to be dried the locking ring 15 is engaged by the recessed portion of the catch 17, such portion being normally maintained in engagement therewith by the action of the spring 20. To detach the reel head from position, the operator grasps two or more of the arms 12 thereof and swings the same inwardly until the arms 12 of the reel head are in upright or folded position. By this operation the rotary collar 14 will be caused to slide upon the casing and engage the curved edge of the lower flange 19, disengaging the catch from the locking ring to permit the reel head complete to be slipped or removed from position.

From the construction illustrated and defined, it will be readily seen that the reel head may be detached from position, should it be found desirable to take the clothes in doors to protect them from the elements and to permit of the wires or flexible elements of the reel head being clean so that the clothes will not be soiled when placed thereon to dry. It will also be seen that the reel head may be adjusted to any suitable height by turning the handle 7 which greatly facilitates in the loading and unloading of the drier.

Having thus described my invention, what I claim as new and desire to secure by Letters-Patent, is:

A clothes drier of the character described comprising an upright guide, an upright support mounted to slide therein, an upright protective casing attached to the upper end of the support, a reel head comprising upper and lower rings adapted to slide upon the casing and locking means for automatically locking the reel head in open position, said means comprising an upright catch pivotally mounted in the casing to normally engage the upper ring, said catch being adapted to be disengaged from the upper ring by sliding the lower ring upwardly upon the casing.

In testimony whereof I have hereunto set my hand in presence of two subscribing witnesses.

WILLIAM S. MORGAN.

Witnesses:
JAMES B. GLEASON,
AMANDA B. ANDERSON.